(12) United States Patent
Hart et al.

(10) Patent No.: US 7,473,482 B2
(45) Date of Patent: Jan. 6, 2009

(54) FUEL CELL MODULE

(75) Inventors: Nigel T. Hart, Derby (GB); Nieves Lapena-Rey, Madrid (ES); Gary J. Wright, Derby (GB); Gerard D. Agnew, Derby (GB)

(73) Assignee: Rolls-Royce plc, London (GB)

( * ) Notice: Subject to any disclaimer, the term of this patent is extended or adjusted under 35 U.S.C. 154(b) by 646 days.

(21) Appl. No.: 10/897,106

(22) Filed: Jul. 23, 2004

(65) Prior Publication Data

US 2005/0014049 A1    Jan. 20, 2005

Related U.S. Application Data

(63) Continuation of application No. PCT/GB03/00272, filed on Jan. 24, 2003.

(51) Int. Cl.
H01M 2/00 (2006.01)
H01M 2/02 (2006.01)
H01M 8/10 (2006.01)

(52) U.S. Cl. .......................................... 429/34; 429/30
(58) Field of Classification Search ........................ None
See application file for complete search history.

(56) References Cited

U.S. PATENT DOCUMENTS 5,209,989 A * 5/1993 Ishihara et al. ................. 429/30
5,925,477 A * 7/1999 Ledjeff et al. ................. 429/32
6,294,279 B1 * 9/2001 Taira ............................ 429/30

FOREIGN PATENT DOCUMENTS

JP     01 258 365 AB     10/1989

* cited by examiner

Primary Examiner—Patrick Ryan
Assistant Examiner—Julian Mercado
(74) Attorney, Agent, or Firm—W. Warren Taltavull; Manelli Denison & Selter PLLC

(57) ABSTRACT

A solid oxide fuel cell module (30) comprises a plurality of fuel cells (36). Each fuel cell (36) comprises a first electrode (40), an electrolyte (42) and a second electrode (44). A plurality of interconnectors (38) are arranged to electrically connect the fuel cells (36) in electrical series. Each interconnector (38) electrically connects a first electrode (40) of one fuel cell (36) to a second electrode (44) of an adjacent fuel cell (36). The first electrode (40) comprises a first layer (40A) on the electrolyte (42 to optimize the electrochemical activity at the electrolyte (42) and a second layer (40B) on the first layer (40A) to provide electronic conduction perpendicular to the layers (40, 42, 44) of the fuel cell (36). The second layer (40B) is arranged such that electronic conduction perpendicular to the layers (40, 42, 44)) of the fuel cell (36) is different at different positions in the second layer (40B).

18 Claims, 2 Drawing Sheets

FUEL CELL MODULE

This is a Continuation of International Appln. No. PCT/GB2003/00272 filed Jan. 24, 2003 designated the U.S.

FIELD OF THE INVENTION

The present invention relates to a fuel cell module, in particular to a solid oxide fuel cell module.

BACKGROUND OF THE INVENTION

Solid oxide fuel cell modules comprising a plurality of solid oxide fuel cells connected in electrical series are known. The solid oxide fuel cells are connected in series by interconnectors.

Solid oxide fuel cells comprising functionally graded anode electrodes and cathode electrodes are known. The functionally graded anode electrodes and cathode electrodes generally comprise a first layer on the electrolyte and a second layer on the first layer. The first layer is arranged to optimise the electrochemical activity at the electrolyte and the second layer is arranged to provide In electronic conduction perpendicular to the layers of the solid oxide fuel cells to allow current to flow from one solid oxide fuel cell to an adjacent solid oxide fuel cell via an interconnector. The second layers provide uniform current collection across the solid oxide fuel cells.

SUMMARY OF THE INVENTION

Accordingly the present invention seeks to provide a novel fuel cell module.

Accordingly the present invention provides a solid oxide fuel cell module comprising a plurality of fuel cells, each fuel cell comprising a first electrode, an electrolyte and a second electrode, a plurality of interconnectors being arranged to electrically connect the fuel cells in electrical series, each interconnector electrically connecting a first electrode of one fuel cell to a second electrode of an adjacent fuel cell, the first electrode comprising a first layer on the electrolyte to optimise the electrochemical activity at the electrolyte and a second layer on the first layer to provide electronic conduction perpendicular to the layers of the fuel cell, the second layer being arranged such that electronic conduction perpendicular to the layers of the fuel cell is different at different positions in the second layer.

Preferably the second electrode comprising a first layer on the electrolyte to optimise the electrochemical activity at the electrolyte and a second layer on the first layer to provide electronic conduction perpendicular to the layers of the solid oxide fuel cell, the second layer being arranged such that electronic conduction perpendicular to the layers of the fuel cell is different at different positions in the second layer.

The second layer may have a different thickness at different positions such that electronic conduction perpendicular to the layers of the fuel cell is different at different positions in the second layer.

Alternatively the second layer has a different composition at different positions such that electronic conduction perpendicular to the layers of the fuel cell is different at different positions in the second layer.

Preferably the second layer has a different geometry at different positions such that electronic conduction perpendicular to the layers of the fuel cell is different at different positions in the second layer.

Preferably the second layer comprises a mesh having a plurality of holes, the holes have a different cross-sectional areas at different positions such that electronic conduction perpendicular to the layers of the fuel cell is different at different positions in the second layer.

Preferably the second layer is arranged such that at a first position near to the interconnector the electronic conduction perpendicular to the layers of the fuel cell is greater than the electronic conduction perpendicular to the layers of the fuel cell at a second position remote from the interconnector.

Preferably the second layer is arranged such that the electronic conduction perpendicular to the layers of the fuel cell progressively decreases between the first position and the second position.

Preferably the fuel cell module comprising a hollow support member, the fuel cells being spaced apart on at least one surface of the hollow support member.

The present invention also provides a solid oxide fuel cell comprising a first electrode, an electrolyte and a second electrode, the first electrode comprising a first layer on the electrolyte to optimise the electrochemical activity at the electrolyte and a second layer on the first layer to provide electronic conduction perpendicular to the layers of the fuel cell, the second layer being arranged such that electronic conduction perpendicular to the layers of the fuel cell is different at different positions in the second layer.

Preferably the second electrode comprising a first layer on the electrolyte to optimise the electrochemical activity at the electrolyte and a second layer on the first layer to provide electronic conduction perpendicular to the layers of the fuel cell, the second layer being arranged such that electronic conduction perpendicular to the layers of the fuel cell is different at different positions in the second layer.

The second layer may have a different thickness at different positions such that electronic conduction perpendicular to the layers of the fuel cell is different at different positions in the second layer.

Alternatively the second layer has a different composition at different positions such that electronic conduction perpendicular to the layers of the fuel cell is different at different positions in the second layer.

Preferably the second layer has a different geometry at different positions such that electronic conduction perpendicular to the layers of the fuel cell is different at different positions in the second layer.

Preferably the second layer comprises a mesh having a plurality of holes, the holes have a different cross-sectional areas at different positions such that electronic conduction perpendicular to the layers of the fuel cell is different at different positions in the second layer.

Preferably the second layer is arranged such that at a first position the electronic conduction perpendicular to the layers of the fuel cell is greater than the electronic conduction perpendicular to the layers of the fuel cell at a second position remote from the first position.

Preferably the second layer is arranged such that the electronic conduction perpendicular to the layers of the fuel cell progressively decreases between the first position and the second position.

Preferably the fuel cell comprises a solid oxide fuel cell.

BRIEF DESCRIPTION OF THE DRAWINGS

The present invention will be more fully described by way of example with reference to the accompanying drawings in which.

DETAILED DESCRIPTION OF THE INVENTION

Figure 1:
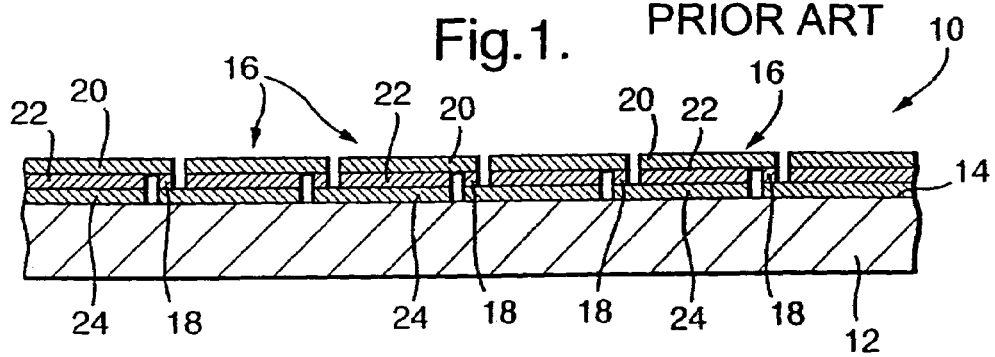
FIG. 1 is a schematic cross-section through a prior art solid oxide fuel cell module.
Figure 2:
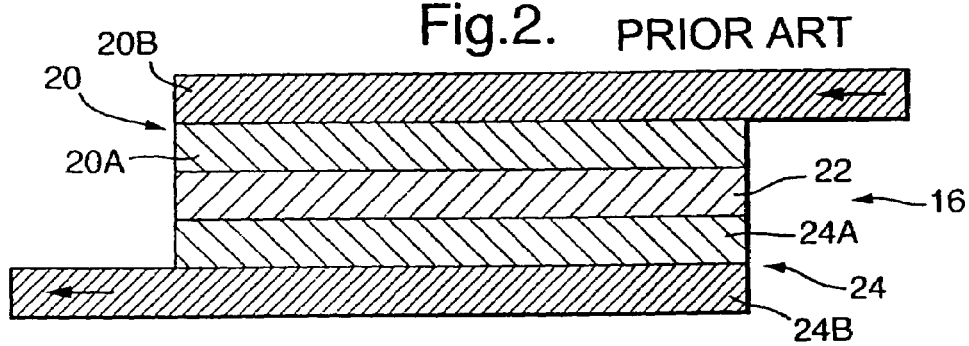
FIG. 2 is an enlarged schematic cross-section through a single solid oxide fuel cell shown in FIG. 1.

A prior art solid oxide fuel cell module 10 is sheen in FIGS. 1 and 2. The solid oxide fuel cell module 10 comprises a hollow support member 12 and a plurality of solid oxide fuel cells 16 spaced apart longitudinally on at least one flat surface 14 of the hollow support member 12. The solid oxide fuel cells are electrically connected in series by a plurality of interconnectors 18. Each solid oxide fuel cell 16 comprises a first electrode 20, a cathode electrode, an electrolyte 22 and a second electrode 24, an anode electrode. The second electrode 24 is arranged on the surface 14 of the hollow support member 12, the electrolyte 22 is arranged on the second electrode 24 and the first electrode 20 is arranged on the electrolyte 22.

The first electrode 20 and the second electrode 24 are functionally graded, as shown more clearly in FIG. 2. The functionally graded first electrode comprises a first Is layer 20A on, or adjacent, the electrolyte 22 and a second layer 20B on, or adjacent, the first layer 20A. The functionally graded second electrode 24 comprises a first layer 24A under, or adjacent, the electrolyte 22 and a second layer 24B under, or adjacent, the first layer 24A. The first layers 20A, 24A are arranged to optimise the electrochemical activity at the electrolyte 22 and the second layers 20B, 24B are arranged to provide electronic conduction perpendicular to the layers 20, 22, 24 of the solid oxide fuel cells 16 to allow current to flow from one solid oxide fuel cell 16 to an adjacent solid oxide fuel cell 16 via a respective interconnector 18. The second layers 20B, 24B provide uniform current collection across the solid oxide fuel cells 16.

Figure 3:
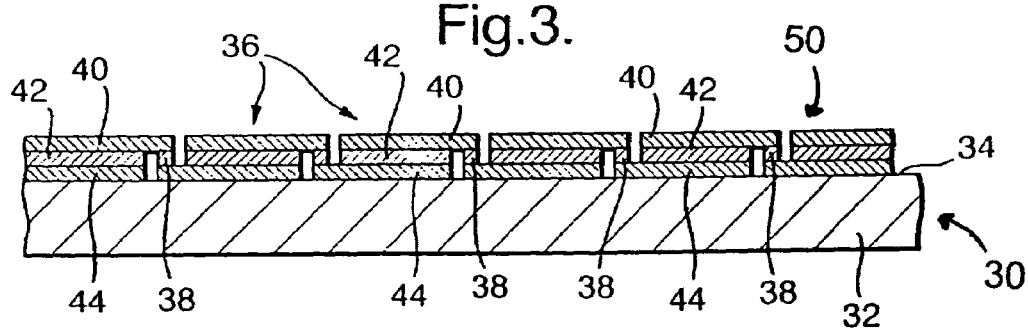
FIG. 3 is a schematic cross-section through a solid oxide fuel cell module according to the present invention.
Figure 4:
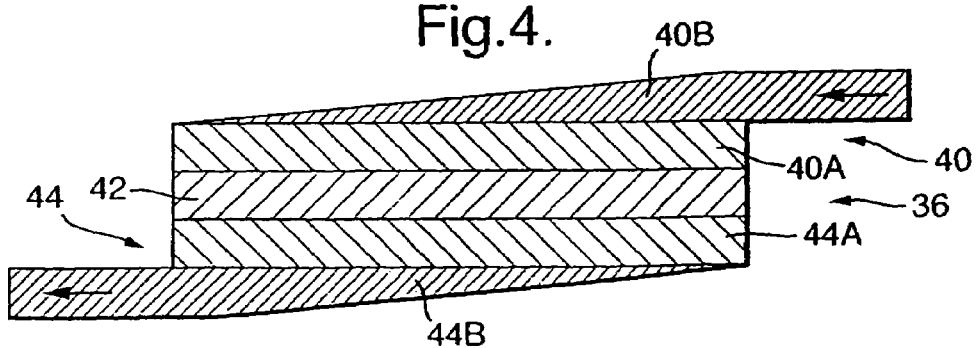
FIG. 4 is an enlarged schematic cross-section through a single solid oxide fuel cell according to the present invention shown in FIG. 3.

A solid oxide fuel cell module 30 according to the present invention is shown in FIGS. 3 and 4. The solid oxide fuel cell module 30 comprises a hollow support member 32 and a plurality of solid oxide fuel cells 36 spaced apart longitudinally on at least one flat surface 34 of the hollow support member 32. The solid oxide fuel cells are electrical connected in series by a plurality of interconnectors 38. Each solid oxide fuel cell 36 comprises a first electrode 40, cathode electrode, an electrolyte 42 and a second electrode 44, anode electrode. The second electrode 44 is arranged on the surface 34 of the hollow support member 32, the electrolyte 42 is arranged on the second electrode 44 and the first electrode 40 is arranged on the electrolyte 42.

The first electrode 40 and the second electrode 44 are functionally graded, as shown more clearly in FIG. 4. The functionally graded first electrode comprises a first layer 40A on, or adjacent, the electrolyte 42 and a second layer 40B on, or adjacent, the first layer 40A. The functionally graded second electrode 44 comprises a first layer 44A under, or adjacent, the electrolyte 42 and a second layer 44B under, or adjacent, the first layer 44A. The first layers 40A, 44A are arranged to optimise the electrochemical activity at the electrolyte 42 and the second layers 40B, 44B are arranged to provide electronic conduction perpendicular to the layers 40, 42, 44 of the solid oxide fuel cells 36 to allow current to flow from one solid oxide fuel cell 36 to an adjacent solid oxide fuel cell 36 via a respective interconnector 38.

The second layers 40B, 44B the second layer being arranged to provide differential current collection across the solid oxide fuel cells 36. The second layers 40B, 44B are arranged such that electronic conduction perpendicular to the layers 40, 42, 44 of the solid oxide fuel cells 16 is different at different positions in the second layers 40B, 44B.

In this example the second layers 40B, 44B have a different thickness at different positions such that the electronic conduction perpendicular to the layers of the solid oxide fuel cells 16 is different at different positions in the second layers 40B, 44B.

In particular it is seen that the thickness of the second layer 40B of the first electrode 40 is greatest at a first end of the first electrode 40 nearest the interconnector 38 and the thickness of the second layer 40B of the first electrode 40 is least at the end of the first electrode 40 remote from the interconnector 18. The thickness of the second layer 40B gradually, continuously, decreases, or tapers, from the first end to the second end of the first electrode 40.

Similarly the thickness of the second layer 44B of the second electrode 44 is greatest at the end of the second electrode 44 nearest the interconnector 38 and the thickness of the second layer 44B of the second electrode 44 is least at the end of the second electrode 44 remote from the interconnector 38. The thickness of the second layer 44B gradually, continuously, decreases, or tapers, from the first end to the second end of the second electrode 44.

Alternatively it may be possible to decrease the thickness of the second layers 40B, 44B in steps.

The losses associated with the second layers 40B, 44B are ohmic losses related to the current and the resistance and are simply expressed as $I^2 R$. In this arrangement the conductivity of the second layers 40B, 44B is related to the cross-sectional area of the second layers 40B, 44B. This arrangement reduces the amount of material used in the second layers 40B, 44B and reduces the costs of the material used in manufacturing the solid oxide fuel cells 16.

The second layers 40B, 44B comprise at least one of palladium, platinum, silver, gold, nickel, copper, cobalt, chromium, iron or ruthenium or an alloy of two or more of these elements.

The thickness of the second layers 40B, 44B may be 100 micrometers at the first end and 1 micrometer at the second end.

Figure 5:
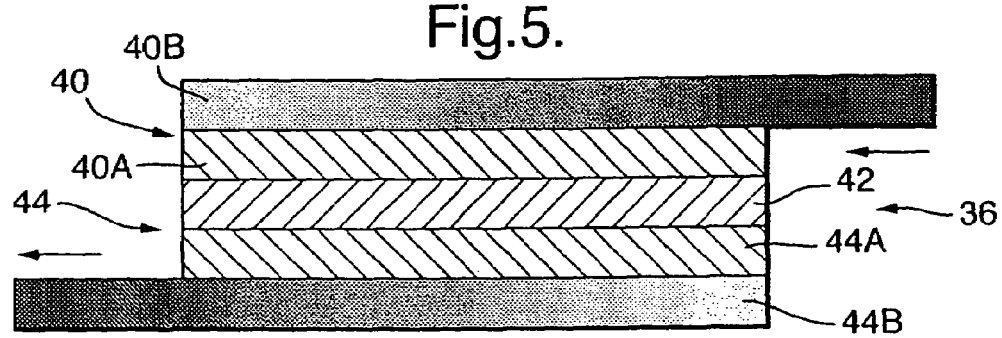
FIG. 5 is an enlarged schematic cross-section through a further solid oxide fuel cell according to the present invention shown in FIG. 3.

A further solid oxide fuel cell module 50 according to the present invention is shown in FIGS. 3 and 5. The solid oxide fuel cell module 50 is similar to that shown in FIGS. 3 and 4.

In this example the second layers 40B, 44B have a different compositions at different positions such that the electronic conduction perpendicular to the layers of the solid oxide fuel cells 16 is different at different positions in the second layers 40B, 44B. The compositions of the second layers 40B, 44B are varied by varying the proportions of a high conductivity material and a low conductivity material.

In particular the composition of the second layer 40B of the first electrode 40 comprises a greater proportion of a high conductivity material at a first end of the first electrode 40 nearest the interconnector 38 and the composition of the second layer 40B of the first electrode 40 comprises a lesser proportion of the high conductivity material at the second end of the first electrode 40 remote from the interconnector 18. The proportion of high conductivity material in the second layer 40B gradually, continuously, reduces from the first end to the second end of the first electrode 40.

Similarly the composition of the second layer 44B of the second electrode 44 is comprises a greater proportion of the high conductivity material at a first end of the second electrode 44 nearest the interconnector 38 and the composition of the second layer 44B of the second electrode 44 comprises a lesser proportion of the high conductivity material at the second end of the second electrode 44 remote from the interconnector 38. The proportion of high conductivity material in the second layer 44B gradually, continuously, reduces, from the first end to the second end of the second electrode 44.

Alternatively the proportion of high conductivity material in the second layer 40B, 44B may reduce in steps rather than continuously.

It is essential to control the microstructure of the second layers 40B, 44B to maintain a constant porosity to allow the oxidant/fuel to reach the first layers 40A, 44A of the first electrode 40 and second electrode 44.

The high conductivity material comprises at least one of palladium, platinum, silver, gold, nickel, copper, cobalt, chromium, iron or ruthenium or an alloy of two or more of these elements. The low conductivity material comprises lanthanum manganite, lanthanum cobalt, a cement or an amorphous metal in a glass phase. The cement comprises at least one of palladium, platinum, silver, gold, nickel, copper, cobalt, chromium, iron or ruthenium or an alloy of two or more of these elements in zirconia or ceria.

As an example the composition at the first end of the second layers 40B, 44B is 100% high conductivity material.

Figure 6:
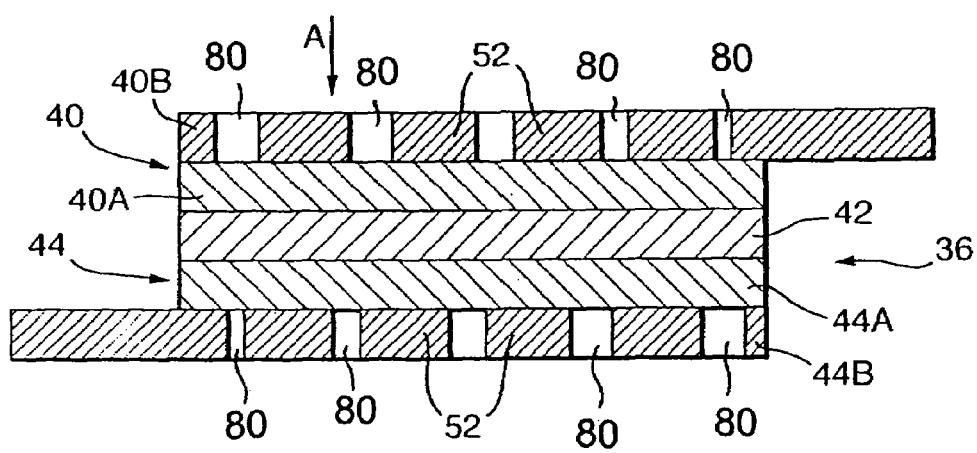
FIG. 6 is an enlarged schematic cross-section through another solid oxide fuel cell according to the present invention shown in FIG. 3.
Figure 7:
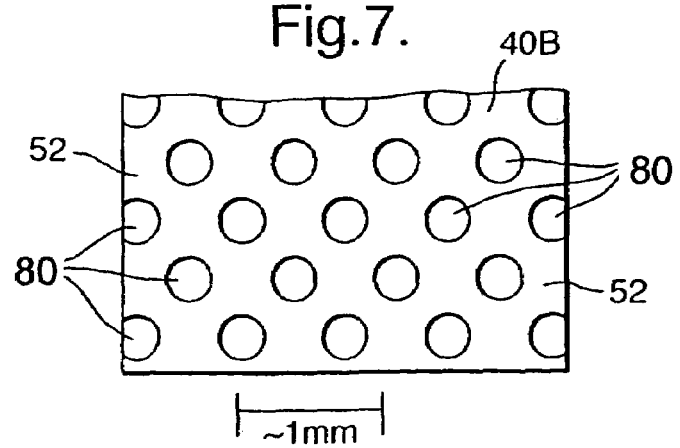
FIG. 7 is a view in the direction of arrow A in FIG. 4.

A further solid oxide fuel cell module 50 according to the present invention is shown in FIGS. 3, 6 and 7. The solid oxide fuel cell module 50 is similar to that shown in FIGS. 3 and 4.

In this example the second layers 40B, 44B have a different geometry at different positions such that the electronic conduction perpendicular to the layers of the solid oxide fuel cells 16 is different at different positions in the second layers 40B, 44B.

In particular it is seen that the cross-sectional area of the second layer 40B in contact with the first layer 40A is greatest at a first end of the first electrode 40 nearest the interconnector 38 and the cross-sectional area of the second layer 40B in contact with the first layer 40A is least at the end of the first electrode 40 remote from the interconnector 18. The cross-sectional area of the second layer 40B in contact with the first layer 40A gradually, continuously, decreases, from the first end to the second end of the first electrode 40.

Similarly the cross-sectional area of the second layer 44B in contact with the first layer 44A is greatest at the end of the second electrode 44 nearest the interconnector 38 and the cross-sectional area of the second layer 44B in contact with the first layer 44A is least at the end of the second electrode 44 remote from the interconnector 38. The cross-sectional area of the second layer 44B in contact with the first layer 44A gradually, continuously, decreases, from the first end to the second end of the second electrode 44.

The second layers 40B, 44B are meshes, that is the second layers 40B, 44B comprises a plurality of holes 80 around which are lands 52. The number of holes 80 per unit area remains constant but the cross-sectional area of the holes 80 gradually increases from the first end to the second end of the second layers 40B, 44B. Alternatively the cross-sectional area of the holes increases in steps. Alternatively the cross-sectional area of the holes remains constant, but the number of holes gradually increases from the first end to the second end of the second layers 40B, 44B. These meshes are preferably produced by screen-printing, but other suitable methods may be used.

The pitch dimension between holes is between 0.05 mm and 5 mm, the diameter of the holes is between 0.05 mm and 5 mm and the lands have a dimension between 0.05 mm and 0.5 mm.

The present invention has been described by way of reference to simple schematic representations of a solid oxide fuel cell module. In practice each of the first electrode, second electrode and electrolyte of each solid oxide fuel cell may comprise one or more layers tailored for particular properties. Seals may be provided to prevent leakage of reactants from the first electrode and second electrode of the solid oxide fuel cells. The present invention is applicable to these practical solid oxide fuel cell modules.

The invention claimed is:

1. A solid oxide fuel cell module comprising a plurality of solid oxide fuel cells, each fuel cell comprising a first electrode, an electrolyte and a second electrode, a plurality of interconnectors being arranged to electrically connect the fuel cells in electrical series, each interconnector electrically connecting a first electrode of one fuel cell to a second electrode of an adjacent fuel cell, the first electrode comprising a first layer on the electrolyte to optimize the electrochemical activity at the electrolyte and a second layer on the first layer to provide electronic conduction perpendicular to the layers of the fuel cell, the cross-sectional area of the second layer in contact with the first layer being different at different positions such that electronic conduction perpendicular to the layers of the fuel cell is different at different positions in the second layer.

2. A solid oxide fuel cell module as claimed in claim 1 wherein the second electrode comprises a first layer on the electrolyte to optimize the electrochemical activity at the electrolyte and a second layer on the first layer to provide electronic conduction perpendicular to the layers of the fuel cell, the second layer being arranged such that electronic conduction perpendicular to the layers of the fuel cell is different at different positions in the second layer.

3. A solid oxide fuel cell module as claimed in claim 1 wherein the cross-sectional area of the second layer in contact with the first layer is greatest at a first end of the first electrode nearest the interconnector, the cross-sectional area of the second layer in contact with the first layer is least at a second end of the first electrode remote from the interconnector, the cross-sectional area of the second layer in contact with the first layer continuously decreases from the first end to the second end of the first electrode.

4. A solid oxide fuel cell module as claimed in claim 3 wherein the second layer comprises a mesh having a plurality of holes, the number of holes per unit area remains constant, the cross-sectional area of the holes gradually increases from the first end to the second end of the second layer such that electronic conduction perpendicular to the layers of the fuel cell is different at different positions in the second layer.

5. A solid oxide fuel cell module as claimed in claim 3 wherein the second layer comprises a mesh having a plurality of holes, the cross-sectional area of the holes remains constant, the number of holes gradually increases from the first end to the second end of the second layer such that electronic conduction perpendicular to the layers of the fuel cell is different at different positions in the second layer.

6. A solid oxide fuel cell module as claimed in claim 1 wherein the second layer is arranged such that at a first position near to the interconnector the electronic conduction perpendicular to the layers of the fuel cell is greater than the electronic conduction perpendicular to the layers of the fuel cell at a second position remote from the interconnector.

7. A solid oxide fuel cell module as claimed in claim 6 wherein the second layer is arranged such that the electronic conduction perpendicular to the layers of the fuel cell progressively decreases between the first position and the second position.

8. A solid oxide fuel cell module as claimed in claim 1 wherein the fuel cell module comprises a hollow support member, the fuel cells being spaced apart on at least one surface of the hollow support member.

9. A solid oxide fuel cell as claimed in claim 1 wherein the composition of the second layer comprises a greater proportion of a high conductivity material at a first end of the first electrode nearest the interconnector, the composition of the second layer comprises a lesser proportion of the high conductivity material at a second end of the first electrode remote from the interconnector, the proportion of high conductivity material in the second layer continuously decreases from the first end to the second end of the first electrode, wherein the high conductivity material comprises at least one of palladium, platinum, silver, gold, nickel, copper, cobalt, chromium, iron or ruthenium, or an alloy of two or more of these materials.

10. A solid oxide fuel cell comprising a first electrode, an electrolyte and a second electrode, the first electrode comprising a first layer on the electrolyte to optimize the electrochemical activity at the electrolyte and a second layer on the first layer to provide electronic conduction perpendicular to the layers of the fuel cell, the cross-sectional area of the second layer in contact with the first layer being different at different positions such that electronic conduction perpendicular to the layers of the fuel cell is different at different positions in the second layer.

11. A solid oxide fuel cell as claimed in claim 10 wherein the second electrode comprises a first layer on the electrolyte to optimize the electrochemical activity at the electrolyte and a second layer on the first layer to provide electronic conduction perpendicular to the layers of the fuel cell, the second layer being arranged such that electronic conduction perpendicular to the layers of the fuel cell is different at different positions in the second layer.

12. A solid oxide fuel cell as claimed in claim 9 wherein the cross-sectional area of the second layer in contact with the first layer is greatest at a first end of the first electrode and least at a second end of the first electrode, the cross-sectional area of the second layer in contact with the first layer continuously decreases from the first end to the second end of the first electrode.

13. A solid oxide fuel cell as claimed in claim 12 wherein the second layer comprises a mesh having a plurality of holes, the number of holes per unit area remains constant, the cross-sectional area of the holes gradually increases from the first end to the second end of the second layer such that electronic conduction perpendicular to the layers of the fuel cell is different at different positions in the second layer.

14. A solid oxide fuel cell as claimed in claim 12 wherein the second layer comprises a mesh having a plurality of holes, the cross-sectional area of the holes remains constant, the number of holes gradually increases from the first end to the second end of the second layer such that electronic conduction perpendicular to the layers of the fuel cell is different at different positions in the second layer.

15. A solid oxide fuel cell as claimed in claim 10 wherein the second layer is arranged such that at a first position the electronic conduction perpendicular to the layers of the fuel cell is greater than the electronic conduction perpendicular to the layers of the fuel cell at a second position remote from the first position.

16. A solid oxide fuel cell as claimed in claim 15 wherein the second layer is arranged such that the electronic conduction perpendicular to the layers of the fuel cell progressively decreases between the first position and the second position.

17. A solid oxide fuel cell as claimed in claim 10 wherein the composition of the second layer comprises a greater proportion of a high conductivity material at a second end of the first electrode, the the high conductivity material at a second end of the first electrode, the proportion of high conductivity material in the second layer continuously decreases from the first end to the second end of the first electrode, wherein the high conductivity material comprises at least one of palladium, platinum, silver, gold, nickel, copper, cobalt, chromium, iron or ruthenium, or an alloy of two or more of these materials.

18. A solid oxide fuel cell module comprising a plurality of solid oxide fuel cells, each fuel cell comprising a first electrode, an electrolyte and a second electrode, a plurality of interconnectors being arranged to electrically connect the fuel cells in electrical series, each interconnector electrically connecting a first electrode of one fuel cell to a second electrode of an adjacent fuel cell, the first electrode comprising a first layer on the electrolyte to optimize the electrochemical activity at the electrolyte and a second layer on the first layer to provide electronic conduction perpendicular to the layers of the fuel cell, the composition of the second layer comprises a greater proportion of a high conductivity material at a first end of the first electrode nearest the interconnector, the composition of the second layer comprises a lesser proportion of the high conductivity material at a second end of the first electrode remote from the interconnector, the proportion of high conductivity material in the second layer continuously decreases from the first end to the second end of the first electrode, wherein the high conductivity material comprises at least one of palladium, platinum, silver, gold, nickel, copper, cobalt, chromium, iron or ruthenium, or an alloy of two or more of these materials.

* * * * *